(12) United States Patent
DeHaan (10) Patent No.: US 9,361,339 B2
(45) Date of Patent: *Jun. 7, 2016

(54) METHODS AND SYSTEMS FOR CONSTRUCTING Q, θ-OPTIMAL HISTOGRAM BUCKETS

(71) Applicant: David E. DeHaan, Waterloo (CA)

(72) Inventor: David E. DeHaan, Waterloo (CA)

(73) Assignee: SAP SE, Walldorf (DE)

( * ) Notice: Subject to any disclaimer, the term of this patent is extended or adjusted under 35 U.S.C. 154(b) by 192 days.

This patent is subject to a terminal disclaimer.

(21) Appl. No.: 14/154,549

(22) Filed: Jan. 14, 2014

(65) Prior Publication Data

US 2015/0149438 A1 May 28, 2015

Related U.S. Application Data (60) Provisional application No. 61/909,202, filed on Nov. 26, 2013.

(51) Int. Cl.
*G06F 17/30* (2006.01)

(52) U.S. Cl.
CPC .... *G06F 17/30469* (2013.01); *G06F 17/30442* (2013.01)

(58) Field of Classification Search
CPC ................................................ G06F 17/30469
See application file for complete search history.

(56) References Cited

U.S. PATENT DOCUMENTS

| | | | |
|---|---|---|---|
| 6,012,054 A | 1/2000 | Seputis | |
| 6,865,567 B1 | 3/2005 | Oommen et al. | |
| 7,363,289 B2 | 4/2008 | Chaudhuri et al. | |
| 7,454,058 B2 | 11/2008 | Porikli | |
| 7,877,374 B2 | 1/2011 | Zabback et al. | |
| 7,987,180 B2 | 7/2011 | Lim et al. | |
| 8,185,519 B2 | 5/2012 | Chaudhuri et al. | |
| 8,229,917 B1 | 7/2012 | Aneas et al. | |
| 8,356,022 B2 | 1/2013 | Eisenreich | |
| 8,386,412 B2 | 2/2013 | Cormode et al. | |
| 8,458,547 B2 | 6/2013 | Viswanathan et al. | |
| 8,473,474 B1 | 6/2013 | Eisenreich | |
| 2005/0223019 A1 | 10/2005 | Das et al. | |
| 2007/0078825 A1 | 4/2007 | Bornhoevd et al. | |
| 2013/0318069 A1 | 11/2013 | Aluç et al. | |

OTHER PUBLICATIONS

Moerkotte, Guido, et al. "Exploiting ordered dictionaries to efficiently construct histograms with q-error guarantees in SAP HANA." Proceedings of the 2014 ACM SIGMOD international conference on Management of data. ACM, 2014.*

Kanne, Carl-Christian et al., "Histograms Reloaded: The Merits of Bucket Diversity", In SIGMOD '10, Jun. 6-11, 2010, Copyright 2010, ACM 978-1-4503-0032-2/10/06, (pp. 663-673, 11 pages total).

Moerkotte, Guido et al., "Preventing Bad Plans by Bounding the Impact of Cardinality Estimation Errors", Proc. Int. Conf. on Very Large Data Bases (VLDB), 2(1), Aug. 24-28, 2009, (pp. 982-994, 11 pages total).

May, Norman et al., U.S. Appl. No. 13/925,610, entitled "Methods and Systems for One Dimensional Heterogeneous Histograms", filed Jun. 24, 2013.

* cited by examiner

*Primary Examiner* — William Spieler
(74) *Attorney, Agent, or Firm* — Buckley, Maschoff & Talwalkar LLC (57) ABSTRACT

A method and system to determine a q, θ-optimal histogram comprising a plurality of buckets over a data distribution where for any cardinality estimate made using the histogram the cardinality estimate is constrained to obey an acceptability criteria parameterized by q and θ that bounds a ratio error between the cardinality estimate and a true value of the cardinality, q being a factor by which the estimate deviates, at most, from a true value of the cardinality and θ being a threshold value which the cardinality does not exceed, wherein a maximum number of possible query intervals generated in determining the acceptability of the q, θ-optimal histogram is less than quadratic in the number of values.

18 Claims, 7 Drawing Sheets

METHODS AND SYSTEMS FOR CONSTRUCTING Q, θ-OPTIMAL HISTOGRAM BUCKETS

BACKGROUND

Some embodiments relate to executing and optimizing queries executed by database management systems. In particular, some embodiments concern methods and systems for optimizing the queries by providing cardinality estimations with guaranteed bounded error in a database management system in an efficient and effective manner. In some aspects, the data structures used to derive the estimates exploit discrete dense domains for faster histogram construction.

DETAILED DESCRIPTION

The following description is provided to enable any person in the art to make and use the described embodiments and sets forth the best mode contemplated for carrying out some embodiments. Various modifications, however, will remain readily apparent to those in the art.

The present disclosure describes methods and systems that, at least in part, use a novel space- and time-efficient algorithm for the construction of maximal q,θ-optimal histogram buckets.

In some aspects, histograms may be used for cardinality estimation problems in, for example, database systems. A q,θ-optimal histogram is a histogram over a data distribution whose buckets have been carefully chosen such that for any cardinality estimate made using the histogram, the estimate is guaranteed to obey an acceptability criteria parameterized by q and θ that bounds the ratio error between the estimate and the true answer.

Histograms are widely used for cardinality estimation problems in, for example, database systems.

A problem of constructing q,θ-optimal histograms may be reduced to the computationally simpler problem of finding a maximal q,θ-optimal histogram bucket from a fixed starting value. That is, a histogram bucket that guarantees for every possible query over the values within the bucket that the resulting estimate is q,θ-acceptable, and which cannot be extended by another value without violating this property.

As a preliminary discussion and introduction to the various methods and systems disclosed herein, a number of concepts will now be discussed. A data distribution D of size n over an ordered numeric value domain is a binary tuple $(\mathcal{V}_{active}, f)$ where

- $\mathcal{V}_{active} \subset \mathcal{V}$ is the active (value) domain of D, and by convention $\mathcal{V}_{active} := \{v_0, \ldots, v_{n-1}\}$ with $v_i < v_{j+1}$; while $f$ is the frequency distribution of D, which is a function $f$: $\mathcal{V} \to \mathcal{N}^+$ that maps each active domain value $v \in \mathcal{V}_{active}$ to a positive integral frequency $f(v) > 0$ and all other elements in $\mathcal{V} \setminus \mathcal{V}_{active}$ to zero.

In some embodiments herein, we consider only data distributions whose active value domain is composed of a set of contiguous integers starting at zero (i.e., having $v_i = i$). This limited scope permits certain simplifications to both the presentation and to the logic of the algorithms disclosed herein. However, this is not a fundamental limitation of the present disclosure and it is possible to generalize the methods, systems, and algorithms herein to handle data distributions whose active domains are composed of arbitrary sets of numeric values.

Given a data distribution D of size n and any pair of values $v_l, v_r \in \mathcal{V}$ with $v_l < v_r$, herein $[v_l, v_r)$ is used to denote the left-closed right-open interval containing values $v \in \mathcal{V}$ satisfying $v_l \leq v < v_r$.

The cardinality of a range query over interval $[v_l, v_r)$ is given by cumulative frequency function $f^+$.

$$f^+(v_l, v_r) = \sum_{v \in [v_l, v_r)} f(v)$$

The result of a count distinct query over interval $[v_l, v_r)$ is given by the count function $f^1$.

$$f^1(v_l, v_r) = \sum_{v \in V_{active} \land v \in [v_l, v_r)} 1$$

The average cardinality per unit in an interval is given by the density function $f^d$, while the average cardinality per active domain value is given by the average function $f^{avg}$.

$$f^d(v_l, v_r) = \frac{f^+(v_l, v_r)}{v_r - v_s}$$

$$f^{avg}(v_l, v_r) = \frac{f^+(v_l, v_r)}{f^1(v_l, v_r)}$$

Finally, the cardinality of an equality query for some value $v \in V$ is simply the frequency $f(v)$.

A histogram bucket B over data distribution D is a data structure that has an associated interval of starting and ending boundary values $[v_s, v_e)$ and which permits exact evaluation of the following queries.

$$f^+(B) := f^+(v_s, v_e)$$
$$f^1(B) := f^1(v_s, v_e)$$
$$f^d(B) := \frac{f^+(B)}{v_e - v_s}$$
$$f^{avg}(B) := \frac{f^+(B)}{f^1(B)}$$

We define the size of bucket B as the width of its boundary interval.

$$|B| := |[v_s, v_e)| = v_e - v_s$$

A histogram over D is a set of histogram buckets corresponding to pair-wise disjoint intervals of boundary values. Because a histogram and its buckets are always defined for a single data distribution D, for the remainder of the present disclosure reference to a bucket B assumes the data distribution D.

Given a histogram bucket B with boundary values $[v_s, v_e)$ and a query interval $[v_l, v_r)$ satisfying $v_s \leq v_l < v_r \leq v_e$, the following approximation functions $\hat{f}^+$, $\hat{f}^1$, $\hat{f}^d$ and $\hat{f}^{avg}$ embody well-known techniques for estimating the functions $\hat{f}^+$, $\hat{f}^1$, $\hat{f}_d$ and $\hat{f}^{avg}$, respectively, using histogram bucket B.

$$\hat{f}^+(v_l, v_r) := \frac{v_r - v_l}{v_e - v_s} f^+(B)$$

$$\hat{f}^1(v_l, v_r) := \frac{v_r - v_l}{v_e - v_s} f^1(B)$$

$$\hat{f}^d(v_l, v_r) := \frac{\hat{f}^+(v_l, v_r)}{v_r - v_l} = \frac{f^+(B)}{v_e - v_s}$$

$$\hat{f}^{avg}(v_l, v_r) := \frac{\hat{f}^+(v_l, v_r)}{\hat{f}^1(v_r, v_l)} = \frac{f^+(B)}{f^1(B)}$$

Similarly, given any value $v \in \mathcal{V}$ satisfying $v_s \leq v < v_e$, the following approximation function embodies a known technique for estimating the cardinality of an equality query using histogram bucket B.

$$\hat{f}(v) := \frac{f^+(B)}{f^1(B)}$$

Herein, we restrict our attention to queries that fall within a single histogram bucket. Known techniques exist for reducing queries that span multiple histogram buckets into collections of smaller queries that do not span buckets.

Within the limited scope we are considering of distributions over dense integer domains, the estimation functions $\hat{f}$, $\hat{f}^1$, and $\hat{f}^{avg}$ can all be re-written as follows.

$$\hat{f}(v) = \hat{f}^+(v, v+1)$$

$$\hat{f}^1(v_l, v_r) = f^1(v_l, v_r) = v_r - v_l$$

$$\hat{f}^{avg}(v_l, v_r) = \hat{f}^d(v_l, v_r) = \frac{\hat{f}^+(v_l, v_r)}{v_r - v_l}$$

Therefore, in order to support estimation functions $\hat{f}^+$, $\hat{f}^1$, $\hat{f}^d$ and $\hat{f}^{avg}$ and $\hat{f}$ it suffices for a histogram bucket to only directly support estimation function $\hat{f}^+$, which requires that each bucket B store enough information to be able to retrieve its value boundaries $v_s$ and $v_e$ and its cumulative frequency $f^+(B)$.

Definition 1.1 (q-Acceptable and q,θ-Acceptable Estimates)

Given a histogram bucket B and a query interval $[v_l, v_r)$ that falls within B:
1. The estimate $\hat{f}^+(v_l, v_r)$ is q-acceptable if $$\frac{1}{q} \leq \frac{f^+(v_l, v_r)}{\hat{f}^+(v_l, v_r)} \leq q.$$

2. The estimate $\hat{f}^+(v_l, v_r)$ is q,θ-acceptable if either
   a. $\hat{f}^+(v_l, v_r) \leq \theta$ and $\hat{f}^+(v_l, v_r) \leq \theta$ or
   b. $\hat{f}^+(v_l, v_r)$ is q-acceptable.

Herein, we call the estimate $\hat{f}^+(v_l, v_r)$ a q-violation if it is not q-acceptable, and a q,θ-violation if it is not q,θ-acceptable. When the bucket B is clear from context, we may refer to the interval $[v_l, v_r)$ itself as the q- or q,θ-violation. Although not needed for the limited scope of distributions over dense integer domains, the concepts of q-acceptable and q,θ-acceptable estimates (and violations) extend directly to both count distinct queries and equality queries.

Definition 1.2 (q,θ-Acceptable Bucket)

Given histogram bucket B over boundary interval $[v_s, v_e)$, herein we call B q,θ-acceptable if every query interval $[v_l, v_r)$ that falls within B has a q,θ-acceptable estimate $\hat{f}(v_l, v_r)$.

Given a q,θ-acceptable histogram bucket B over interval $[v_s, v_e)$, we state that B is locally maximal if no q,θ-acceptable bucket exists for the boundary interval $[v_s, v_e+1)$, and we further state that B is globally maximal if no q,θ-acceptable bucket exists for any boundary interval $[v_s, v_e=k)$ with k>0. As described in previous literature, the q-error produced by estimation functions over a histogram bucket increases almost monotonically with the size of the bucket, which implies that with rare exception a locally maximal q,θ-acceptable bucket is almost always globally maximal. This property suggests an iterative method for constructing q,θ-optimal histograms starting with the smallest value in the data distribution and sequentially construct locally maximal q,θ-acceptable histogram buckets, with the ending value boundary for the bucket constructed in one iteration forming the starting value boundary for the bucket constructed in the next iteration [2, 1].

In some embodiments, we do not propose any changes to this overarching algorithm for q,θ-optimal histogram construction. Rather, the present disclosure focuses on the subproblem of how to efficiently construct a locally-maximal q,θ-acceptable histogram bucket.

Algorithm 1 disclosed below illustrates a method for constructing a q,θ-acceptable histogram bucket from a given starting value using a simple generate-and-test methodology.

---
Algorithm 1: Naive q,θ-Acceptable Bucket Construction
---
BUILDMAXBUCKETNAIVE(q, θ, D, $v_s$)
- Input: Ratio error q
- Input: Threshold θ
- Input: Data distribution D = ($\mathcal{V}_{active}$, f)
- Input: Starting value $v_s \in \mathcal{V}_{active}$
1 $B_{max} \leftarrow \emptyset$
2 for each possible endpoint $v_e \in \mathcal{V}_{active}$ with $v_s < v_e$
3   do B ← histogram bucket over $[v_s, v_e)$
4   if $|B| > |B_{max}|$ and ISACCEPTABLEBUCKETNAIVE(q, ϑ, D, B)
5   then $B_{max} \leftarrow B$
6 return $B_{max}$
ISACCEPTABLEBUCKETNAIVE(q, θ, D, B)
- Input: Ratio error q
- Input: Threshold θ
- Input: Data distribution D = ($\mathcal{V}_{active}$, f)
- Input: Histogram bucket B over $[v_s, v_e)$
1 for i from $v_s + 1$ to $v_e$
2   do for j from i − 1 to $v_s$
3     do if $\hat{f}^+(j, i)$ is not q,θ-acceptable
4       then return false
5 return true

---

Referring to algorithm 1, the outer method BUILDMAXBUCKETNAIVE enumerates histogram buckets of different sizes and for each bucket tests whether it is q,θ-acceptable. The inner method ISACCEPTABLEBUCKETNAIVE decides q,θ-acceptability of the given bucket by directly implementing Definition 1.2 (hereinabove) via an exhaustive enumeration of all query intervals contained within the bucket.

Although Algorithm 1 may appear conceptually simple, its overall structure and asymptotic performance corresponds to the best bucket construction algorithms proposed in previous literature [1], with the following two caveats.

1. Method IsAcceptableBucketNaive may be enhanced with various heuristics that permit a faster decision of q,θ-acceptability for special cases such as the following.

The method can return true if $f^+(B) < \theta$.

Let $v_{min}$ and $v_{max}$ denote the minimum and maximum values in the bucket, respectively. The method can return true if $$\frac{v_{max}}{v_{min}} \le q.$$

Let b denote the predicate $$\left(\frac{v_{max}}{f^d(B)} \le q \text{ AND } \frac{f^d(B)}{v_{min}} \le q\right).$$

The method can return true if b is true.

The method can return false if b is false and θ=0.

While these heuristics can dramatically improve bucket construction times for certain data distributions, they do not alter the worst-case asymptotic runtime of IsAcceptableBucketNaive, which is quadratic in the size of B on each invocation. For illustrative clarity, such heuristics have been omitted from the pseudo-code in Algorithm 1 to improve the readability thereof.

2. In method BuildMaxBucketNaive, the order in which the loop enumerates $v_e$ has intentionally been left underspecified, and the loop contains no early termination. As a result, the pseudo-code exhaustively enumerates all $|\{v \in V_{active} | v_s < v\}|$ possible buckets that guarantees that the algorithm returns a globally maximal bucket. Some practical algorithms suggested in the literature structure the enumeration order to allow early termination once a locally maximal bucket has been found, and may partition the bucket construction and q,θ-acceptability test into a fixed number of "bucklets." These details have been omitted from the pseudo-code in Algorithm 1 to improve the readability thereof, since they are orthogonal to the overarching generate-and-test algorithmic structure.

As observed above, each call to IsAcceptableBucketNaive requires, in the worst case, enumerating $O(|B_{max}|^2)$ different intervals. The overall runtime depends on how the loop enumeration and termination is implemented in BuildMaxBucketNaive. For example, using a simple linear scan yields overall runtime $O(|B_{max}|^3)$, whereas a more sophisticated binary search-based enumeration yields $O(|B_{max}|^2 \log|B_{max}|)$.

As introduced and discussed hereinabove, decision procedure IsAcceptableBucketNaive from Algorithm 1 incurs a quadratic runtime because it naively implements Definition 1.2. Below, certain properties of q,θ-acceptability will first be derived and then used to design a new sub-quadratic decision procedure IsAcceptableBucketNaive.

Given histogram bucket B over interval $[v_s,v_e)$, let interval $[v_l,v_r)$ be a q-violation proving that B is not q-acceptable. We refer to $[v_l,v_r)$ herein as a minimal q-violation if there does not exist another q-violation $[v_l',v_r')$ that is a strict sub-interval of $[v_l,v_r)$. A minimal q,θ-violation may be analogously defined.

Theorem 3.1

Let $[v_l,v_r)$ be a q,θ-violation, and let $v_m$ be any value satisfying $v_l < v_m < v_r$. If
1. $f^+(v_l,v_m) > \theta$ or $\hat{f}^+(v_l,v_m) > \theta$; and
2. $f^+(v_m,v_r) > \theta$ or $\hat{f}^+(v_m,v_r) > \theta$ then q,θ-violation $[v_l,v_r)$ is not minimal.

Corollary 3.2

If interval $[v_l,v_r)$ is a minimal q,θ-violation, then its maximum size is bounded as follows.

$$v_r - v_l < \frac{2\theta}{f^d(B)} + 3 = \frac{2\theta|B|}{f^+(B)} + 3$$

Corollary 3.2 bounds the maximum size query interval that needs to be considered in order to conclude that no q,θ-violations exist. By integrating this bound into decision procedure IsAcceptableBucketNaive from Algorithm 1, procedure IsAcceptableBucketMVS is obtained as shown in Algorithm 2.

---

Algorithm 2: Deciding q,θ-Acceptability with Minimal Violation Size

---

ISACCEPTABLEBUCKETMVS(q,θ,D,B)
- Input: Ratio error q
- Input: Threshold θ
- Input: Data distribution D = ($V_{active}$, f)
- Input: Histogram bucket B over $[v_s,v_e)$ 1    for i from $v_s + 1$ to $v_e$
2      do for j from i − 1 to $\max\left(v_s, \left\lceil \frac{2\theta|B|}{f^+(B)} \right\rceil - 3\right)$
3        do if $\hat{f}^+(j, i)$ is not q,θ-acceptable
4          then return false
5    return true

---

The new decision procedure has worst-case asymptotic runtime bound of $$O\!\left(\frac{\theta}{f^+(B)}|B|^2\right) = O\!\left(\frac{\theta}{f^d(B)}|B|\right).$$

Note that it can be assumed that $$\frac{\theta}{f^+(B)} \le 1$$

or else me decision problem is trivial. Comparing $$O\!\left(\frac{\theta}{f^d(B)}|B|\right)$$

to the $O(|B|^2)$ bound of the previous decision procedure, it is seen that this is a substantial improvement because the new procedure scales linearly with the number of distinct values in B, since for moderately large B the value $f^d(B)$ is basically unchanging as B increases, and θ remains constant (albeit a potentially large θ).

As discussed above, the worst-case runtime of IsAcceptableBucketMVS scales linearly in the size of B, but it also scales linearly in the size of θ. While the maximal q,θ-acceptable bucket size can be increased by increasing either parameter q or θ, increasing q reduces the quality of all histogram estimates, whereas increasing θ only affects the quality of histogram estimates with low cardinality. For applications such as query optimization that demand both tiny histograms (i.e., large bucket sizes) and small ratio error for high-cardinality estimates, the parameter θ may be chosen to have significantly large values.

In some embodiments, a strategy for partially mitigating the effect of large e values is suggested by the following axiom and its corollary, which follow trivially from the definition of q,θ-acceptability.

Axiom 3.3

If bucket B contains a q,θ-violation, then B also contains a q,θ'-violation for all θ'<θ

Corollary 3.4 q,θ'-acceptability implies q,θ-acceptability for all θ'<θ

As an example, consider an invocation of BUILDMAXBUCKETNAIVE from Algorithm 1 given a large value for θ. Furthermore, consider the case where the enumeration phase of BUILDMAXBUCKETNAIVE constructs a very large bucket B that is q,θ'-acceptable for some θ' much smaller than θ. The positive test for q,θ-acceptability on line 4 of the algorithm incurs runtime cost proportional to θ. Now observe that in this illustrative case the test could have been replaced with a positive q,θ'-acceptability test that incurs runtime cost proportional to θ' and could be combined with Corollary 3.4 to deduce q,θ-acceptability of B. However, had the q,θ'-acceptability test instead returned false, it would neither imply nor rule out q,θ-acceptability and so a second invocation of the decision procedure would be required with a larger θ value.

The above example suggests that an iterative approach to testing q,θ-acceptability may yield performance improvements for large θ. However, rather than repeating entire invocations of the decision procedure, it may be more efficient to iteratively increase the value of θ within a single invocation of the decision procedure.

Definition 3.5 (Effective Theta)

For a given invocation of a q,θ-acceptability test of some bucket B, an effective theta, $\theta_{\mathit{eff}}$, is defined as the smallest value such that the result of the q, $\theta_{\mathit{eff}}$-acceptability test implies the result of the q,θ-acceptability test. If B is q,θ-acceptable then $\theta_{\mathit{eff}} \leq \theta$; otherwise $\theta_{\mathit{eff}} = \theta$.

---

Algorithm 3: Deciding q,θ-Acceptability with Dynamic $\theta_{\mathit{eff}}$

ISACCEPTABLEBUCKETDYNAMIC(q,θ,D,B)
> Input: Ratio error q
> Input: Threshold θ
> Input: Data distribution D = ($\mathcal{V}_{active}$, f)
> Input: Histogram bucket B over [$v_s$,$v_e$)

1  $\theta_{\mathit{eff}} \leftarrow 0$
2  for i from $v_s$ + 1 to $v_e$
3      do for j from i − 1 to $\max\left(v_s, i - \left\lceil \frac{2\theta_{\mathit{eff}}|B|}{f^+(B)} \right\rceil - 3\right)$
4         do if $\hat{f}^+$ (j, i) is not q, $\theta_{\mathit{eff}}$-acceptable
5            then $\theta_{\mathit{eff}} \leftarrow \max(\hat{f}^+(j, i), f^+ (j, i))$
6             if $\theta_{\mathit{eff}} > \theta$
7               then return false
8  return true

---

Decision procedure ISACCEPTABLEBUCKETDYNAMIC shown in Algorithm 3 starts by initializing $\theta_{\mathit{eff}}$ to zero. Each time some q, $\theta_{\mathit{eff}}$-violation [j,i) is found, $\theta_{\mathit{eff}}$ is increased to the maximal point at which [j,i) is still a q, $\theta_{\mathit{eff}}$-violation. If at this point $\theta_{\mathit{eff}} \geq \theta$ then [j,i) is also a q,θ-violation. It is noted that each time $\theta_{\mathit{eff}}$ is increased it affects the computation on line 3 of Algorithm 3 that bounds the maximum size of query interval [j,i) that will be enumerated.

The asymptotic runtime of procedure ISACCEPTABLEBUCKETDYNAMIC is identical to procedure ISACCEPTABLEBUCKETMVS discussed above except that θ is replaced by $\theta_{\mathit{eff}}$. In the worst case $\theta_{\mathit{eff}} = \theta$. Thus, the two procedures have identical asymptotic performance. However, when θ is large and the data distribution has a well-behaved frequency distribution, amortized across many bucket constructions, then the difference between θ and the average value of $\theta_{\mathit{eff}}$ may be substantial.

The following theorem and corollaries enable further improvements to Algorithm 3 that exploit knowledge of recently-enumerated intervals to reduce the search space in certain cases.

Theorem 3.6

Let [$v_l$,$v_r$) be a minimal q,θ-violation, and let $v_m$ be any value satisfying $v_l < v_m < v_r$.

1. If [$v_l$,$v_m$) is q-acceptable, then $\hat{f}^+(v_m,v_r) \leq \theta$ and $\hat{f}^+(v_m, v_r) \leq \theta$.

2. If [$v_m$,$v_r$) is q-acceptable, then $\hat{f}^+(v_l,v_m) \leq \theta$ and $\hat{f}^+(v_l,v_m) \leq \theta$.

Corollary 3.7

Let [$v_l$,$v_r$) be a minimal q,θ-violation, and let $v_m < v_r$ be the largest value such that [$v_m$,$v_r$) is q-acceptable. Then the maximum size of [$v_l$,$v_r$) is bounded as follows.

$$v_r - v_l < \frac{\theta}{f^d(B)} + (v_r - v_m) + 1$$

Corollary 3.8

Let [$v_l$,$v_r$) be a minimal q,θ-violation. If [$v_{r-1}$,$v_r$) is q-acceptable, then [$v_l$,$v_{r-1}$) is a q-violation but not a q,θ-violation.

Corollary 3.7 permits the number of iterations of the loop on line 3 of Algorithm 3 to be reduced in certain cases. For each iteration of the outer loop on line 2, a boolean variable can be used to detect when the first q-acceptable interval [j,i) is enumerated by the loop starting at line 3. This interval corresponds to [$v_m$,$v_r$) in Corollary 3.7, and so the corollary permits computation of a new maximum size for the intervals with right endpoint $v_r$=i that need to be enumerated by the remaining iterations of the loop on line 3.

Corollary 3.8 permits the loop on line 3 of Algorithm 3 to be completely skipped in certain cases. For each iteration of the loop starting on line 2, a boolean variable can be used to record whether any of the intervals enumerated by the loop starting on line 3 are q-violations. Upon the next iteration of the loop at line 2, if the singleton range query [i−1,i) is q-acceptable and the previous iteration did not find any q-violations with a right endpoint of i−1, then the evaluation of the loop on lines 3-7 can be skipped because Corollary 3.8 guarantees there cannot be a minimal q,θ-violation with right endpoint of i.

As discussed above, the bucket construction method in Algorithm 1 has a stratified generate-and-test structure in which procedure BUILDMAXBUCKETNAIVE generates candidate buckets and for each generated bucket invokes decision procedure ISACCEPTABLEBUCKETNAIVE to test its q,θ-acceptability. Also discussed above, the present disclosure narrowly focused on the efficiency of a single invocation of the decision procedure, and proposed improved q,θ-acceptability decision procedures that are drop-in replacements for ISACCEPTABLEBUCKETNAIVE within Algorithm 1.

The present disclosure will now consider inefficiencies that may be present in Algorithm 1 in the stratification between the generation and test layers, and introduces an alternate algorithmic structure that tightly integrates the testing of $q,\theta$-acceptability with an incremental construction of candidate buckets. For clarity of presentation, the disclosure here will ignore the results obtained using Algorithm 3 and use the original Algorithm 1 as the basis for the following illustrative discussion. However, the algorithmic improvements presented herein for eliminating the stratification between generation and testing are orthogonal to the algorithmic improvements related to Algorithms 2 and 3. It is a straightforward matter to combine the results herein with the various results hereinabove to yield a unified construction algorithm that utilizes all of the foregoing techniques.

Consider Algorithm 1, and note that there are three loops in a nested arrangement:

1. Line 2 of BUILDMAXBUCKETNAIVE enumerates in unspecified order right endpoints $v_e$ of candidate buckets. (The bucket left endpoint $v_s$ is fixed.)
2. Line 1 of ISACCEPTABLEBUCKETNAIVE enumerates in increasing order right endpoints $v_r$ of potential $q,\theta$-violations.
3. Line 2 of ISACCEPTABLEBUCKETNAIVE enumerates in decreasing order left endpoints $v_l$ of potential $q,\theta$-violations.

The following observation provides a key insight for eliminating one of these loops.

Observation 4.1

Deciding $q,\theta$-acceptability per Definition 1.1 does not require knowing the interval $[v_s, v_e)$ of candidate bucket B. Instead, it suffices to know only $f^d(B)$ in order to compute $\hat{f}^+(v_l, v_r)$.

By applying Observation 4.1 to the $q,\theta$-acceptability test on line 3 of ISACCEPTABLEBUCKETNAIVE we are able to remove the restriction that the inner two loops must execute within the context of an already-constructed bucket B. Instead, the first two loops may be combined and overload the meaning of the loop variable to be both the right endpoint of candidate buckets and the right endpoint of potential $q,\theta$-violations. Rather than immediately classifying the enumerated query intervals as acceptable or violations, the upper and lower bounds on the value of $f^d(B)$ that each query interval allows (for unknown B) may be computed, maintaining the intersection across all query intervals enumerated so far. When constructing some bucket B, it is determined test whether $f^d(B)$ falls within the permitted upper and lower bounds; if not, then B violates some previously-enumerated query interval (i.e., a $q,\theta$-violation that the previous algorithm would have enumerated when $v_r < v_e$).

Pseudo-code of the new procedure BUILDMAXBUCKETINCREMENTAL is given in Algorithm 4.

---

Algorithm 4: Incremental $q,\theta$-Acceptable Bucket Construction

BUILDMAXBUCKETINCREMENTAL($q, \theta, D, v_s$)
  ➤ Input: Ratio error q
  ➤ Input: Threshold $\theta$
  ➤ Input: Data distribution D = ($\mathcal{V}_{active}$, f)
  ➤ Input: Starting value $v_s \in \mathcal{V}_{active}$
1  B ← ∅
2  LB ← 0
3  UB ← ∞
4  for i from $v_s$ + 1 to $|\mathcal{V}_{active}|$ + 1
5    do for j from i − 1 to $v_s$
6      do if $f^+(j, i) > \theta$

---

Algorithm 4: Incremental $q,\theta$-Acceptable Bucket Construction 7  then LB ← max$\left(\text{LB}, \dfrac{f^d(j, i)}{q}\right)$ 8  UB ← min$\left(\text{UB}, \max\left(\dfrac{\theta}{i-j}, f^d(j, i) \times q\right)\right)$ 9        if $f^d(v_s, i) <$ LB or UB $< f^d(v_s, i)$
10         then return B
11       B ← histogram bucket over $[v_s, i)$
12  return B

---

Variables LB and UB represent the (inclusive) lower and upper bounds that $f^d(B)$ must stay between to avoid a $q,\theta$-violation by an already-enumerated query interval, and they are updated for each query interval $[j,i)$. Variable LB bounds the lowest permitted value for $f^d(B)$ that yields a $q,\theta$-acceptable estimate $\hat{f}^+(j,i)$. Because LB is bounding under-estimates, such an estimate can only be a $q,\theta$-violation (c.f. Definition 1.1) if the true cumulative frequency $f^+(j,i)$ exceeds $\theta$ and $f^d(j,i)$ exceeds $\hat{f}^d(j,i)$ by more than a factor q. Lines 6-7 increase LB if necessary to within a factor q of $f^d(j,i)$. Variable UB bounds the highest permitted value for $f^d(B)$ that yields a $q,\theta$-acceptable estimate $\hat{f}^+(j,i)$. Because UB is bounding over-estimates, such an estimate can only be a $q,\theta$-violation if the estimated cumulative frequency $\hat{f}^+(j,i) = (i-j)f^d(B)$ exceeds $\theta$ and $\hat{f}^d(j,i)$ exceeds $f^d(j,i)$ by more than a factor q. Line 8 decreases UB if necessary until one of those two conditions is no longer true. Line 9 tests the current bucket $[v_s, i)$ against the upper and lower bounds and returns the previous bucket if a $q,\theta$-violation has been found.

The asymptotic complexity Of BUILDMAXBUCKETINCREMENTAL as shown in Algorithm 4 is $O(|B|^2)$. However, by applying the techniques presented above in connection with Algorithms 2 and 3, the runtime of the entire bucket construction algorithm may be reduced to the same asymptotic complexity as previously derived for the $q,\theta$-acceptability decision procedure.

As mentioned above, previous construction algorithms for $q,\theta$-optimal histograms have been extended so that a single construction call builds a fixed number equi-width "bucklets" at the same time, which are stored together as a single bucket within the overall histogram. For simplicity, assume that eight equi-width bucklets are constructed at one time. The eight bucklet frequencies can then be compressed together into a single 64-bit bucket payload using one of a variety of different compression schemes that allocate a certain number of bits (e.g., 16) to compressed storage of the cumulative frequency for the entire bucket, and a certain number of bits (e.g., 6) to compressed storage of the cumulative frequency of each bucklet. Such a bucklet-based storage scheme reduces the number of required histogram buckets by a constant factor, which reduces the number of values that need to be stored to identify value boundaries. (In some aspects, the savings in frequency storage is less pronounced since a relatively large payload such as 64-bits is required, whereas an atomic histogram bucket storing only a frequency count could be reasonably compressed down to 8 bits).

In some regards, a disadvantage of such a scheme is that the reliance on equi-width bucklets to avoid storing intermediate bucklet boundaries limits the maximum width of the eight bucklets to the width of the first bucket to violate $q,\theta$-acceptability.

In some aspects, the incremental construction algorithm described above does not permit separating the generation and testing phases, which may make it less suited to building a group of equi-width bucklets. Whereas a generate-and-test algorithm can iteratively extend and test bucklets as a group, the incremental construction algorithm builds bucklets serially and so cannot know when to stop extending the first bucklet in cases where a q,θ-violation would occur in a later bucklet of a shorter length.

In some embodiments, the incremental construction algorithm herein may be used to construct individual bucklets within a bucket that uses bucklet-based compression. In order to permit the bucklets to be constructed serially the storage structure permits the bucklets to take on different widths rather than making an equi-width assumption. To accomplish this, some embodiments extend any of the schemes for storing bucklet frequencies with additional bits to encode the bucklet boundaries that are interior to the overall histogram bucket interval. For example, for a bucket composed of eight variable-width bucklets, seven interior boundary values may be stored. Assume that 64 bits are used to store a compressed encoding of the cumulative frequencies as described above. Adding another 64 bits to the bucket payload to store boundary information permits the seven interior boundaries to each be represented as a 9-bit integer encoding the bucklet width, which means that seven of the bucklets have a maximum width of 511 domain values, while one bucklet—referred to herein as the implicit bucklet—has unconstrained width that can be computed by first computing the width of the overall bucket from the bucket boundaries, and then subtracting the stored widths of the other seven bucklets. The remaining 64−7*9=1 bit may be used as a flag to indicate whether the implicit bucklet is the first or the last bucklet in the bucket. The construction algorithm for the overall bucket simply invokes BUILDMAXBUCKETINCREMENTAL eight times to build eight adjacent bucklets of varying width, but for some of those invocations an additional maximum width parameter is passed to force the bucklet construction to terminate if the width reaches the given value, which would be 511 in this example case. The invocation for the first bucklet does not specify a maximum width, so the returned bucklet may or may not exceed width 511. If the first bucklet exceeds width 511, then it becomes the implicit bucklet and the other seven are built with a specified maximum width of 511. If the first bucklet does not exceed width 511, then the next six bucklets are built with maximum width 511 while the last bucklet becomes the implicit bucklet and is built without a specified maximum width.

In some aspects, embodiments herein may, at least, simplify the optimization of a query (in a plan generator) and/or provide a cardinality estimation guarantee. For example, in an instance a query optimizer generates a first plan with an accurate cardinality estimate and thus a histogram with a guaranteed maximum error of "x", then the optimizer may efficiently determine that a second (or any other) plan that does not provide better guarantee that the factor "x" should not be chosen or recommended.

Figure 1:
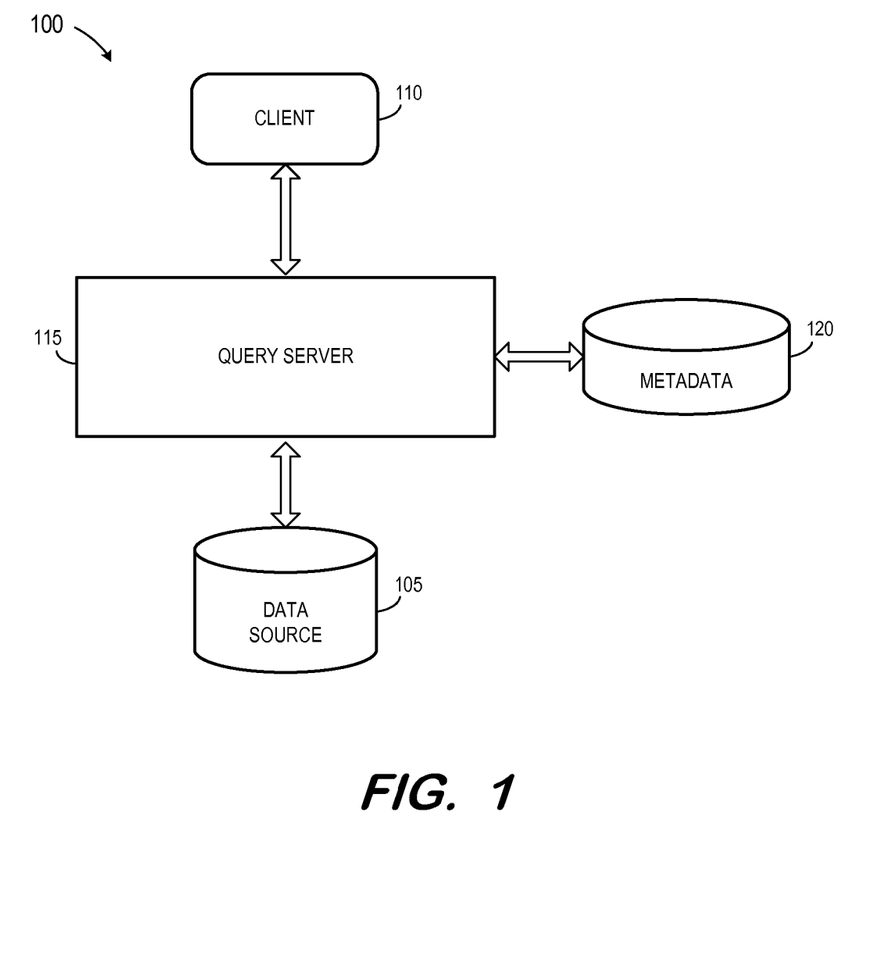
FIG. 1 is an illustrative depiction of a system architecture, according to some embodiments.

FIG. 1 is a block diagram of system 100 according to some embodiments. System 100 includes data source 105, client 110, and query server 315. Data source 105 may comprise any query-responsive data source or sources that are or become known, including but not limited to a structured-query language (SQL) relational database management system. Data source 105 may comprise a relational database, a multi-dimensional database, an eXtendable Markup Language (XML) document, or any other data storage system storing structured and/or unstructured data. The data of data source 105 may be distributed among several relational databases, multi-dimensional databases, and/or other data sources. Embodiments are not limited to any number or types of data sources. For example, data source 105 may comprise one or more OnLine Analytical Processing (OLAP) databases, spreadsheets, text documents, presentations, etc.

In some embodiments, data source 105 is implemented in Random Access Memory (e.g., cache memory for storing recently-used data) and one or more fixed disks (e.g., persistent memory for storing their respective portions of the full database). Alternatively, data source 105 may implement an "in-memory" database, in which volatile (e.g., non-disk-based) memory (e.g., Random Access Memory) is used both for cache memory and for storing its entire respective portion of the full database. In some embodiments, the data of data source 105 may comprise one or more of conventional tabular data, row-based data stored in row format, column-based data stored in columnar format, and object-based data. Data source 105 may also or alternatively support multi-tenancy by providing multiple logical database systems which are programmatically isolated from one another. Moreover, the data of data source 105 may be indexed and/or selectively replicated in an index to allow fast searching and retrieval thereof.

Metadata 120 may provide information regarding the structure, relationships and meaning of the data stored within data source 105. Metadata 120 may also include data defining views on the stored data, and queries that may be executed upon the stored data. Metadata 120 may be generated by a database administrator.

Query server 115 generally provides data of data source 110 to reporting clients, such as client 110, in response to instructions (e.g., SQL statements) received therefrom. In some embodiments, query server 115 receives an instruction from client 110. Query server 115 generates an execution plan based on the instruction and on metadata 140. The execution plan is forwarded to data source 105, which executes the plan and returns a dataset based on the SQL script. Query server 115 then returns the dataset to client 110. Embodiments are not limited thereto.

Client 110 may comprise one or more devices executing program code of a software application for presenting user interfaces to allow interaction with query server 115. Presentation of a user interface may comprise any degree or type of rendering, depending on the type of user interface code generated by query server 115. For example, client 110 may execute a Web Browser to receive a Web page (e.g., in HTML format) from query server 115, and may render and present the Web page according to known protocols. Client 110 may also or alternatively present user interfaces by executing a standalone executable file (e.g., an .exe file) or code (e.g., a JAVA applet) within a virtual machine.

Figure 2:
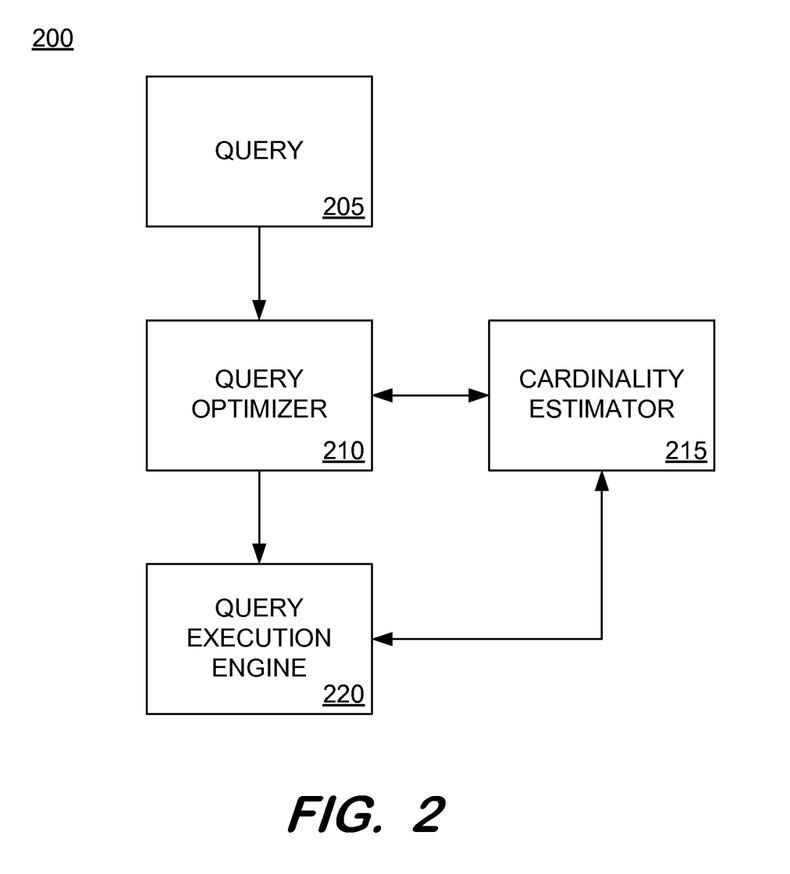
FIG. 2 is flow diagram of a process according to some embodiments.

FIG. 2 is a functional flow diagram for a process or service of a database management system (DBMS) 200. DBMS may include or incorporate aspects of the system of FIG. 1, including for example, data source 105, query server 115, and metadata 120. A query 205 may be sent to, obtained by, or otherwise received by a cost based query optimizer 210. Optimizer 210 may be implemented by a query server 115 or other server providing the services and functionality of optimizer 210. Optimizer 210 may operate to produce a query execution plan for executing the query request 205 in a "cost effective" manner. In some aspects, query optimizer 210 and (potentially) query execution engine 220 interact with a cardinality estimator 215. In some aspects, query optimizer 210 may mainly retrieve data from cardinality estimator 215, while query execution engine 220 may have a bi-directional data exchange relationship with cardinality estimator 215.

Cardinality estimator 215 may be used by the optimizer to determine or calculate cardinality estimates. Cardinality estimator 215 may interact with query execution engine 220 because, for example, the query execution engine (or data source) provides the raw data to generate statistics. In some cases, the cardinality estimates may also be used for approximate query processing. The query plan generated by query optimizer 210 may be forwarded to and executed by a query execution engine 220 of the DBMS in a runtime environment (not shown). In some instances (e.g., special cases where a cardinality estimation may be too costly), query optimizer 210 may not interact with cardinality estimator 215. In some embodiments, a query server such as, for example, query server 115 may comprise cardinality estimator 215 or the functionality thereof, while in some other or alternative embodiments cardinality estimator 215 may be a component, system, subsystem, or service that is distinct from the query server.

Figure 3:
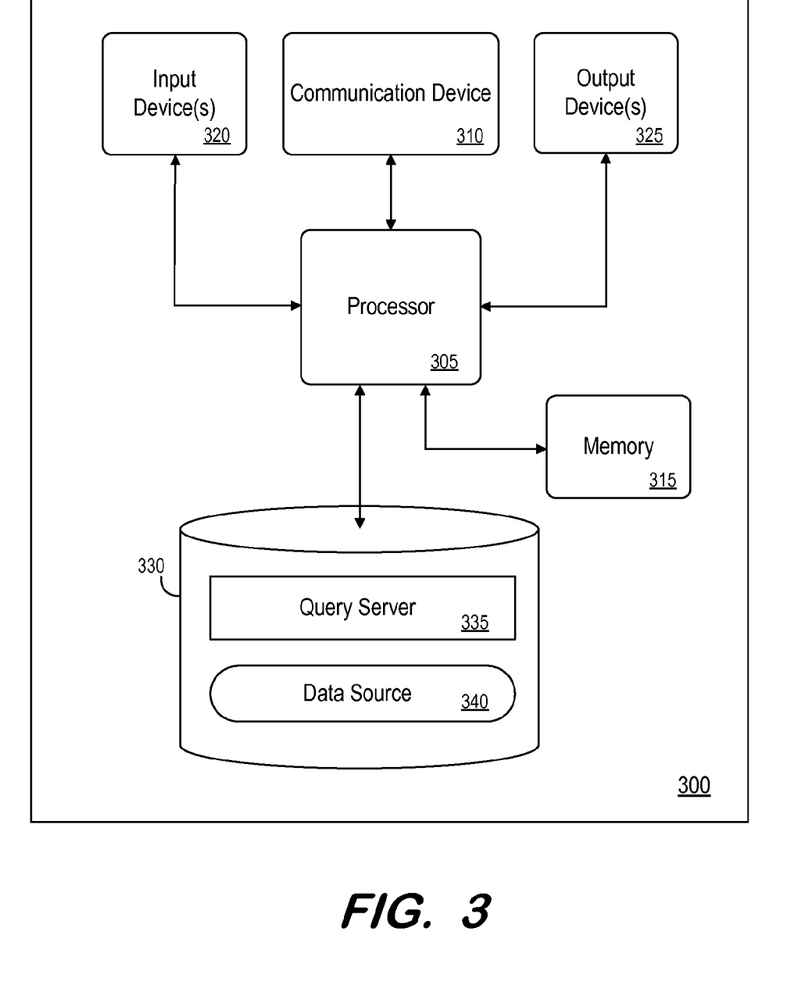
FIG. 3 is an illustrative depiction of an apparatus, according to some embodiments herein.

FIG. 3 is a block diagram of apparatus 300 according to some embodiments. Apparatus 300 may comprise a general-purpose computing apparatus and may execute program code or instructions to perform any of the processes described herein. Apparatus 300 may comprise an implementation of query server 115, comprising an in-memory database. Apparatus 300 may include other unshown elements according to some embodiments.

Apparatus 300 includes processor 305 operatively coupled to communication device 310, data storage device 330, one or more input devices 320, one or more output devices 325 and memory 315. Communication device 310 may facilitate wired or wireless communication with external devices, such as a client device or a data storage device. Input device(s) 320 may comprise, for example, a keyboard, a keypad, a mouse or other pointing device, a microphone, knob or a switch, an infra-red (IR) port, a docking station, and/or a touch screen. Input device(s) 320 may be used, for example, to enter information into apparatus 300. Output device(s) 325 may comprise, for example, a display (e.g., a display screen) a speaker, and/or a printer.

Data storage device 330 may comprise any appropriate persistent storage device, including combinations of magnetic storage devices (e.g., magnetic tape, hard disk drives and flash memory), optical storage devices, Read Only Memory (ROM) devices, etc., while memory 315 may comprise Random Access Memory (RAM).

Query server 335 may comprise program code or instructions executed by processor 305 to cause apparatus 300 to perform any one or more processes based on the algorithms disclosed herein. Embodiments are not limited to execution of such processes by a single apparatus. Data source 340 may implement data source 105 as described above. As also described above, data source 340 may be implemented in volatile memory. Data storage device 330 may also store data and other program code for providing additional functionality and/or which are necessary for operation of apparatus 300, such as device drivers, operating system files, etc.

To empirically validate the techniques disclosed herein, applicant implemented multiple histogram bucket construction algorithms within SAP HANA. Experiments were then performed to test both the construction time and resulting histogram size for histograms built with the different bucket construction algorithms. The experiments were performed on a HANA system SPS7 running on a SLES11 SP1 system with Intel Xeon E5-2660 CPUs with 2.2 GHz regular clock speed and 256 GB main memory. All binaries were compiled using GCC 4.3.4 with O3. Because the histogram construction code used in the experiments was single-threaded, all experiments ran on a single core. However, the methods and processes disclosed herein are not limited to being performed, implemented, or embodied by such a system.

Two different data sets were used in the experiments. The first data set was taken from an internal development system for SAP ERP system used to analyze mixed OLAP and OLTP workloads. The schema consists of 133 tables with 757 columns in total. The second data set was derived from customer data of a large warehouse system. The schema consists of 229 tables with 2410 columns in total. The largest of these columns contains 168 million distinct values.

For many of these columns, it does not make sense to create a histogram since:
1. Many columns contained less than 20 distinct values. If needed, we can store precise statistics for each value for these columns, rather than constructing a histogram.
2. The value distribution for a primary key or uniqueness constraint is trivial once it a column has been dictionary-encoded. We know the number of distinct values from the dictionary created for these columns.

Applying these restrictions on the columns resulted in 688 columns of the ERP data set and 192 of the BW data set.

The histograms for each column were created five times, and we report the average construction time for these five runs. For all experiments, we test with a maximal q-error per bucket of 2.0. This choice of a rather small q-error guarantees high quality estimates, and is, in some embodiments, the default value for maximal q-error within the SAP HANA implementation. If not mentioned otherwise, we let the histogram construction component choose a value for parameter θ using a simple sublinear function of the cumulated frequency.

The construction time and space consumption of histograms generated over dictionary-encoded values were analyzed. In some embodiments, dictionary-encoded values are the default case for histograms in SAP HANA.

Histograms were constructed by five different construction algorithms:
1. F8Dgt—This algorithm implements a prior method for construction of q,θ-optimal histogram buckets, as described in paragraph hereinabove. The construction algorithm has the same generate-and-test structure as Algorithm 1, but the generation phase uses binary search and constructs and tests eight fixed-width bucklets on each iteration. The testing phase uses various heuristics to avoid an expensive q,θ-acceptability test, but when these heuristics fail it performs a naïve quadratic test that does not include any of the optimizations discussed herein. Once the algorithm has found the maximal bucket width that yields q,θ-acceptable bucklets, it encodes the frequencies of the eight bucklets into a 64-bit bucket payload as described above.
2. 1Dinc—This algorithm implements the incremental bucket construction algorithm described hereinabove and illustrated in Algorithm 4. Although it does include additional heuristics not shown in Algorithm 4, it does not include any of the optimizations discussed above. Once the algorithm has incrementally grown a bucket to maximal size, it stores the cumulative frequency as an atomic 8-bit compressed integer.
3. V8Dinc—This algorithm uses the same incremental construction method as 1Dinc, but uses the method described in paragraph hereinabove to iteratively construct and encode eight variable-width bucklets into a single bucket with a 128-bit payload.
4. 1DincB—This algorithm enhances 1Dinc with all of the optimizations described hereinabove.

5. V8DincB—This algorithm enhances V8Dinc with all of the optimizations described hereinabove.

Figure 4:
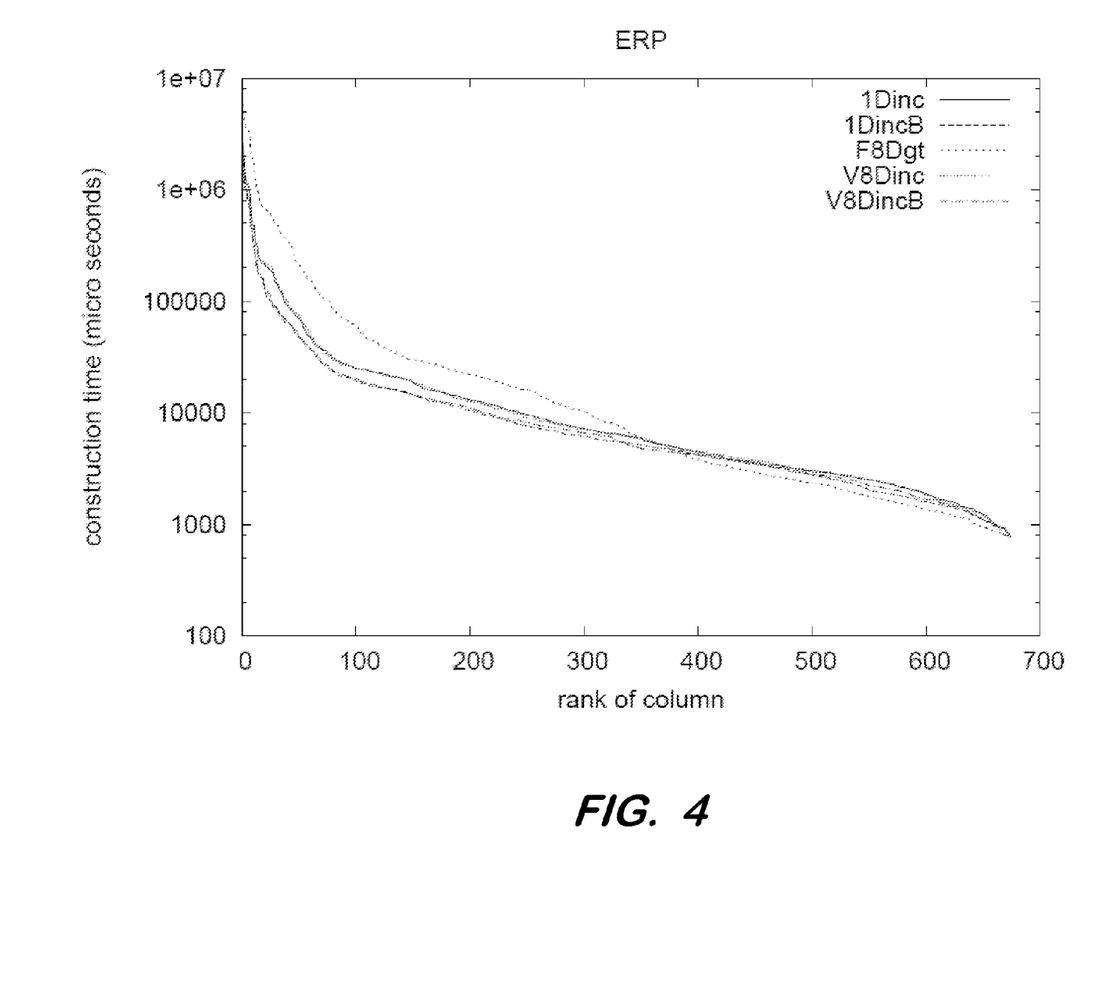
FIGS. 4 and 5 are graphs of histogram construction times, according to some embodiments herein.
Figure 5:
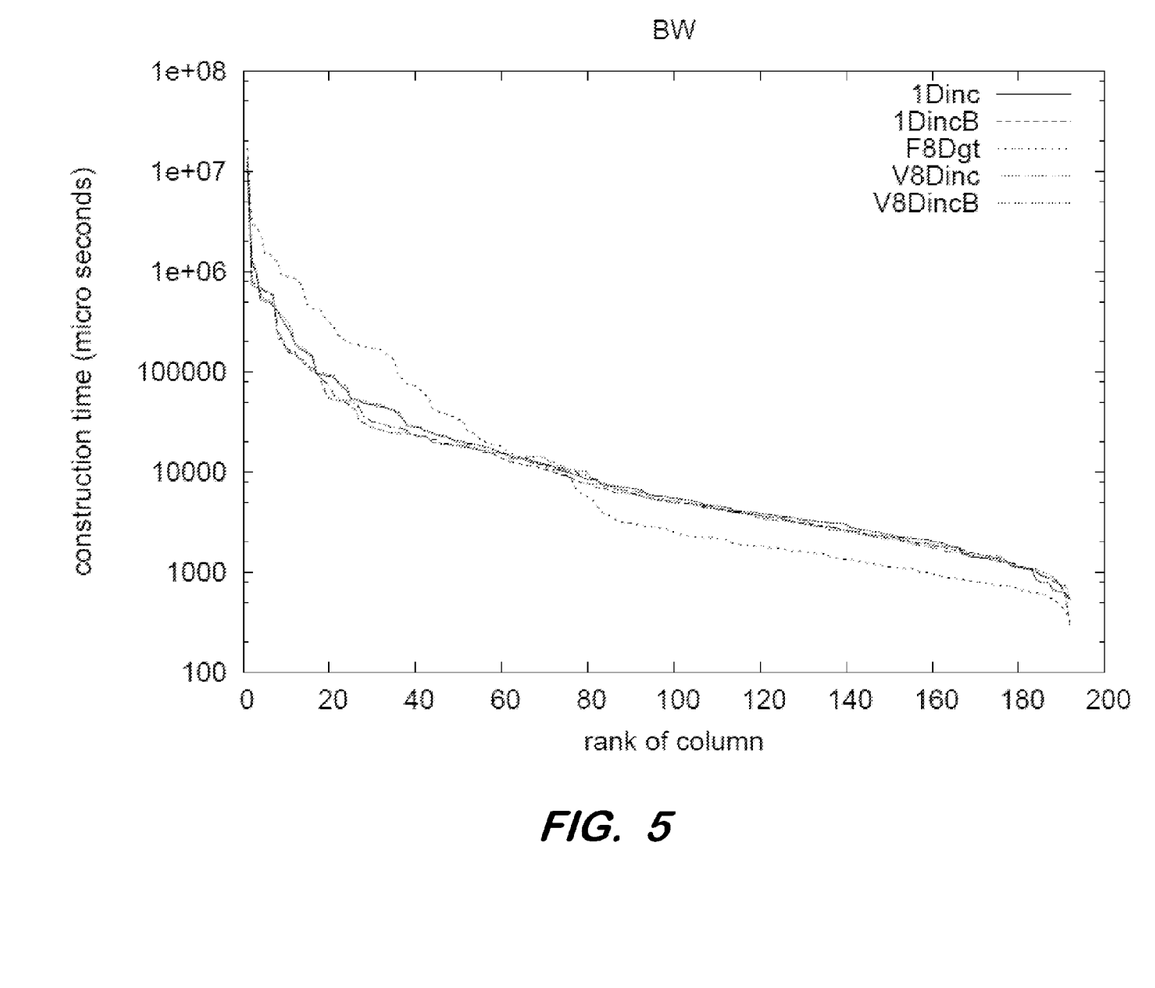
Figure 6:
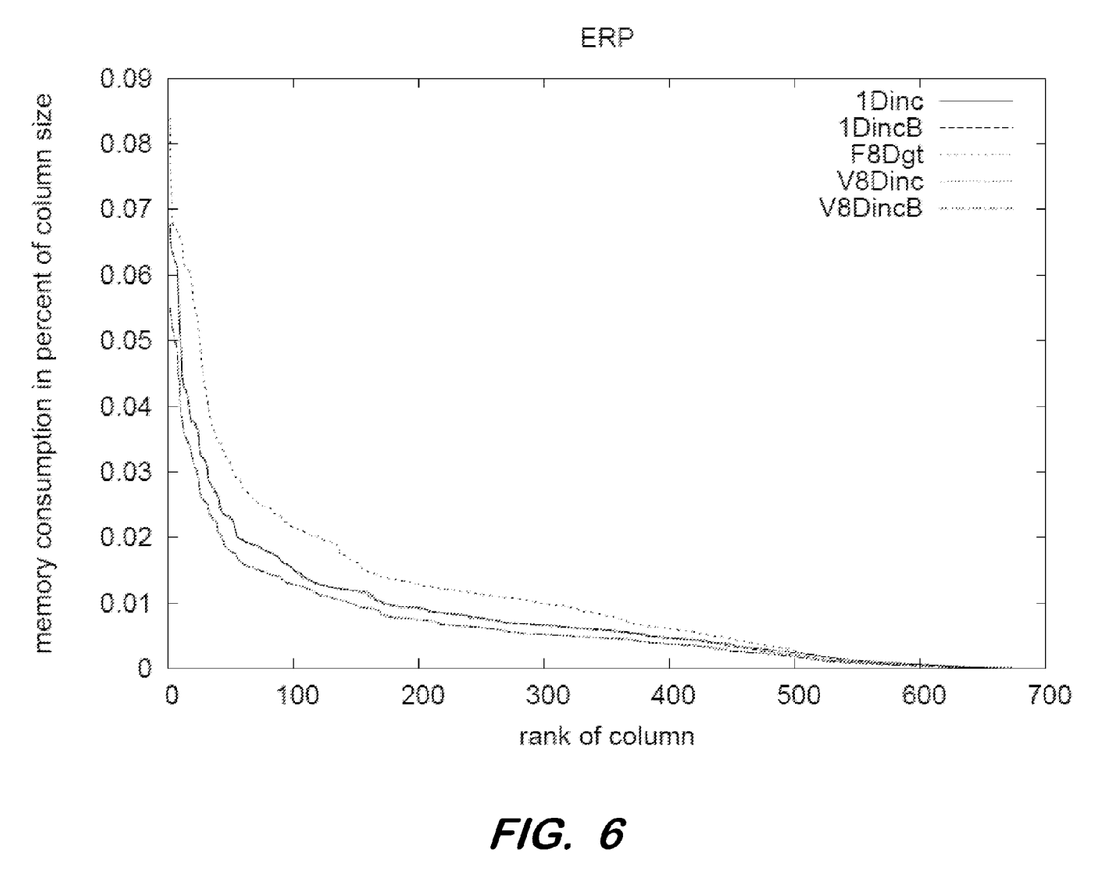
FIGS. 6 and 7 are graphs of histogram memory consumption size, according to some embodiments herein.
Figure 7:
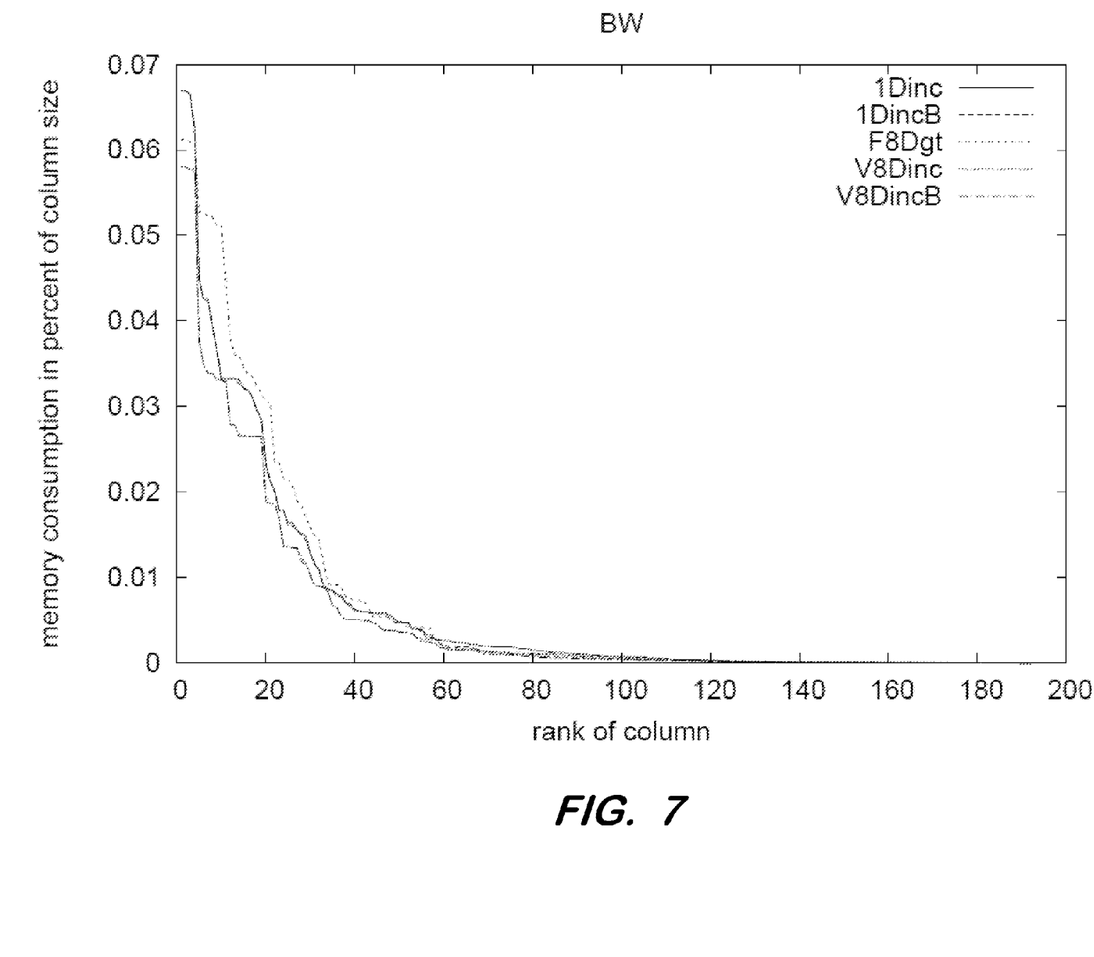

FIGS. 4 and 5 contain the results for construction times of histograms on dictionary-encoded ERP and BW data sets, respectively, using the five algorithms described above. In FIGS. 4 and 5, the columns are sorted along the x-axis by their construction times. FIGS. 6 and 7 contain analogous results for relative memory consumption of the histograms compared to the storage size of the uncompressed column data. In FIGS. 6 and 7, the columns are sorted along the x-axis by their relative memory size.

Note that the difference between algorithms 1 Dinc and V8inc is primarily one of storage format. As such, we expect their construction times to be very similar, and this is confirmed by FIGS. 4 and 5. A similar comment applies to algorithms 1 DincB and V8incB.

The utility of the incremental bucket construction method disclosed herein is illustrated by comparing the construction times for algorithms F8Dgt and V8Dinc. These algorithms both build histogram buckets containing eight bucklets, they utilize similar heuristics, and neither algorithm includes some of the optimizations from above; the primary difference is that F8Dgt has a generate-and-test structure, whereas V8Dinc uses the incremental construction introduced and disclosed herein. FIGS. 4 and 5 show that F8Dgt is faster for simple histograms whose construction requires approximately 10 ms or less; however, the more important case is how the algorithms scale on larger data, and in those cases it is clear that the incremental algorithm is generally faster by more than a factor of two. In addition, FIGS. 6 and 7 show that the histograms generated by V8Dinc are always smaller than the histograms generated by F8gt.

In some aspects, a utility of the optimizations described in herein can be demonstrated by comparing algorithms V8Dinc and V8DincB, which are identical other than these additional optimizations. FIGS. 4 and 5 show that the construction times for these two algorithms are comparable for simple histograms whose construction requires approximately 10 ms or less. For more expensive histograms the algorithm V8DincB—which utilizes the optimizations from above—is always faster, often by a factor ranging between 1.1-2.0. FIGS. 6 and 7 show that the memory consumption is identical for V8Dinc and V8DincB, which is expected since these optimizations only affect computation time of the search algorithm, not its final result.

In some aspects, a utility of the variable-width bucklet-based storage format described herein can be demonstrated by comparing the memory consumption of algorithms V8Dinc and 1Dinc. FIGS. 6 and 7 show that the memory consumption of algorithm V8Dinc—which uses the bucklet-based storage format—is always less than algorithm 1 Dinc which uses traditional atomic histogram buckets.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 and/or system 300 may include a processor to execute program code such that the computing device operates as described herein.

All algorithms and processes disclosed herein may be embodied in processor-executable program code read from one or more of non-transitory computer-readable media, such as a removable disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations.

What is claimed is:

1. A computer-implemented method of optimizing execution of a query that accesses data by a computer, the method comprising:
generating, by a query sever having a processor, a cardinality estimate using a q, θ-optimal histogram comprising a plurality of buckets over a data distribution where, for any cardinality estimate made using the histogram, the cardinality estimate is constrained to obey an acceptability criteria parameterized by q and θ that bounds a ratio error between the cardinality estimate and a true value of the cardinality, q being a factor by which the estimate deviates, at most, from a true value of the cardinality and θ being a threshold value which the cardinality estimate does not exceed, wherein a maximum number of possible query intervals generated in determining the acceptability of the q, θ-optimal histogram is less than quadratic in the number of values for the maximum number of possible query intervals;
using the cardinality estimation generated based on the q, θ-optimal histogram that obeys the acceptability criteria parameterized by q and θ to determine, by the processor of the query server, an optimal query plan for executing the query; and
producing an output of the optimal query plan, wherein a bucket in the plurality of buckets is constructed by incrementally extending a smaller q, θ-acceptable bucket without need to test the new bucket for q, θ-violations whose intervals are wholly contained within the smaller bucket.

2. The method of claim 1, wherein each of the plurality of buckets is to store at least one of a number of distinct values contained in that bucket and a cumulated frequency of the number of distinct values stored therein.

3. The method of claim 1, wherein if a bucket in the plurality of buckets contains a q, θ-violation, then that bucket also contains a q, θ'-violation for all θ' less than θ.

4. The method of claim 1, wherein for an interval $[v_l, v_r)$ within the plurality of buckets that is a minimal q,θ-violation, if $[v_{r-1}, v_r)$ is q-acceptable, then $[v_l, v_{r-1})$ is a q-violation but not a q,θ-violation.

5. The method of claim 1, further comprising constructing individual bucklets within the plurality of buckets of the q, θ-optimal histogram, including allocating compressed storage for: a cumulative frequency for the plurality of buckets, a cumulative frequency of the individual bucklets, and boundaries of the individual bucklets that are interior to an overall histogram bucket interval of the q, θ-optimal histogram.

6. The method of claim 1, further comprising:
generating, using the q, θ-optimal histogram, cardinality estimates for at least one query execution plan for executing a query;
using the cardinality estimates to determine an optimal query plan for executing the query; and
producing an output of the optimal query plan.

7. A non-transitory medium having program instructions embodied thereon, the medium comprising:
instructions to generate a cardinality estimate using a q, θ-optimal histogram comprising a plurality of buckets over a data distribution where, for any cardinality estimate made using the histogram, the cardinality estimate is constrained to obey an acceptability criteria parameterized by q and θ that bounds a ratio error between the cardinality estimate and a true value of the cardinality, q being a factor by which the estimate deviates, at most, from a true value of the cardinality and θ being a threshold value which the cardinality estimate does not exceed, wherein a maximum number of possible query intervals generated in determining the acceptability of the q, θ-optimal histogram is less than quadratic in the number of values for the maximum number of possible query intervals;
instructions to use the cardinality estimation generated based on the q, θ-optimal histogram that obeys the acceptability criteria parameterized by q and θ to determine an optimal query plan for executing the query; and
instructions to produce an output of the optimal query plan, wherein a bucket in the plurality of buckets is constructed by incrementally extending a smaller q, θ-acceptable bucket without need to test the new bucket for q,θ-violations whose intervals are wholly contained within the smaller bucket.

8. The medium of claim 7, wherein each of the plurality of buckets is to store at least one of a number of distinct values contained in that bucket and a cumulated frequency of the number of distinct values stored therein.

9. The medium of claim 7, wherein if a bucket in the plurality of buckets contains a q, θ-violation, then that bucket also contains a q, θ'-violation for all θ' less than θ.

10. The medium of claim 7, wherein for an interval $[v_l,v_r)$ within the plurality of buckets that is a minimal q,θ-violation, if $[v_{r-1},v_r)$ is q-acceptable, then $[v_l,v_{r-1})$ is a q-violation but not a q,θ-violation.

11. The medium of claim 7, further comprising instructions to construct individual bucklets within the plurality of buckets of the q, θ-optimal histogram, including allocating compressed storage for: a cumulative frequency for the plurality of buckets, a cumulative frequency of the individual bucklets, and boundaries of the individual bucklets that are interior to an overall histogram bucket interval of the q, θ-optimal histogram.

12. The medium of claim 7, further comprising:
instructions to generate, using the q, θ-optimal histogram, cardinality estimates for at least one query execution plan for executing a query;
instructions to use the cardinality estimates to determine an optimal query plan for executing the query; and
instructions to produce an output of the optimal query plan.

13. A system comprising:
a computing device comprising:
a memory storing processor-executable program code; and
a processor to execute the processor-executable program code in order to cause the computing device to:
generate, by a query sever having a processor, a cardinality estimate using a q, θ-optimal histogram comprising a plurality of buckets over a data distribution where, for any cardinality estimate made using the histogram, the cardinality estimate is constrained to obey an acceptability criteria parameterized by q and θ that bounds a ratio error between the cardinality estimate and a true value of the cardinality, q being a factor by which the estimate deviates, at most, from a true value of the cardinality and θ being a threshold value which the cardinality estimate does not exceed, wherein a maximum number of possible query intervals generated in determining the acceptability of the q, θ-optimal histogram is less than quadratic in the number of values for the maximum number of possible query intervals;
use the cardinality estimation generated based on the q, θ-optimal histogram that obeys the acceptability criteria parameterized by q and θ to determine an optimal query plan for executing the query; and
produce an output of the optimal query plan, wherein a bucket in the plurality of buckets is constructed by incrementally extending a smaller q,θ-acceptable bucket without need to test the new bucket for q,θ-violations whose intervals are wholly contained within the smaller bucket.

14. The system of claim 13, wherein each of the plurality of buckets is to store at least one of a number of distinct values contained in that bucket and a cumulated frequency of the number of distinct values stored therein, or, in some cases, only a cumulated frequency of the number of distinct values stored therein.

15. The system of claim 13, wherein a maximum size query interval needed to conclude a guaranteed acceptability is bound by a predetermined formula.

16. The system of claim 13, wherein for an interval $[v_l,v_r)$ within the plurality of buckets that is a minimal q,θ-violation, if $[v_{r-1},v_r)$ is q-acceptable, then $[v_l,v_{r-1})$ is a q-violation but not a q,θ-violation.

17. The system of claim 13, wherein the processor further executes the processor-executable program code in order to cause the computing device to construct individual bucklets within the plurality of buckets of the q, θ-optimal histogram, including allocating compressed storage for: a cumulative frequency for the plurality of buckets, a cumulative frequency of the individual bucklets, and boundaries of the individual bucklets that are interior to an overall histogram bucket interval of the q, θ-optimal histogram.

18. The system of claim 13, wherein the processor further executes the processor-executable program code in order to cause the computing device to:
generate, using the q, θ-optimal histogram, cardinality estimates for at least one query execution plan for executing a query;
use the cardinality estimates to determine an optimal query plan for executing the query; and
produce an output of the optimal query plan.

* * * * *